US012771144B2

(12) United States Patent
Nakamura

(10) Patent No.: US 12,771,144 B2
(45) Date of Patent: Oct. 20, 2026

(54) POWER MANAGEMENT SYSTEM

(71) Applicant: TOYOTA JIDOSHA KABUSHIKI KAISHA, Toyota (JP)

(72) Inventor: Tohru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 18/800,585

(22) Filed: Aug. 12, 2024

(65) Prior Publication Data

US 2025/0141237 A1 May 1, 2025

(30) Foreign Application Priority Data

Oct. 31, 2023 (JP) ................................ 2023-186597

(51) Int. Cl.
*B60L 53/68* (2019.01)
*B60L 53/66* (2019.01)
*H02J 7/40* (2026.01)

(52) U.S. Cl.
CPC ................ *H02J 7/40* (2026.01); *B60L 53/66* (2019.02); *B60L 53/68* (2019.02)

(58) Field of Classification Search
CPC .. H02J 7/40; B60L 53/66; B60L 53/68; Y02T 10/70; Y02T 10/7072; Y02T 90/12; Y02T 90/16; Y02T 90/167; Y04S 30/12
See application file for complete search history.

(56) References Cited

U.S. PATENT DOCUMENTS

2004/0125787 A1* 7/2004 May .................... H04L 27/2607 370/503
2016/0178678 A1* 6/2016 Pelletier ................. B60L 53/63 700/291

FOREIGN PATENT DOCUMENTS

JP 2022184741 A * 12/2022

* cited by examiner

*Primary Examiner* — Yuhui R Pan
(74) *Attorney, Agent, or Firm* — SoraIP, Inc.

(57) ABSTRACT

The management server executes processing including a step of determining whether to acquire the second data from EVSE, a step of determining whether to acquire the first data from DCM when it is determined to acquire the second data from EVSE, a step of calculating an offset quantity when it is determined to acquire the first data from DCM, a step of executing a synchronization processing, and a step of executing power control.

3 Claims, 6 Drawing Sheets

POWER MANAGEMENT SYSTEM

CROSS-REFERENCE TO RELATED APPLICATION

This application claims priority to Japanese Patent Application No. 2023-186597 filed on Oct. 31, 2023, incorporated herein by reference in its entirety.

BACKGROUND

1. Technical Field

The present disclosure relates to power management systems.

2. Description of Related Art

Power management systems for managing energy in a power grid are known in the art. For example, there are cases where a vehicle equipped with an energy storage device is connected to the power grid via a building. In order to control the power in the energy storage device mounted on the vehicle, communication may be performed between the server and the vehicle according to various communication standards.

Japanese Unexamined Patent Application Publication No. 2022-184741 (JP 2022-184741 A) discloses a technique in which devices that perform communication according to a plurality of communication standards are controlled by converting the communication format etc.

SUMMARY

Such a server and a vehicle communicate with each other by wireless communication in some cases. However, when the power grid and the vehicle are connected by a cable etc., the server and the vehicle may communicate with each other by wired communication. It is required to appropriately handle received information when communication is performed through a plurality of communication paths.

The present disclosure was made to address the above issue, and an object of the present disclosure is to provide a power management system that appropriately handles information acquired through different communication paths.

A power management system according to an aspect of the present disclosure includes:

- a vehicle equipped with an energy storage device;
- transfer equipment configured to perform power transfer between a power grid and the energy storage device; and
- a server configured to communicate with the vehicle.

The server includes

- a communication device configured to perform communication through a first communication path and a second communication path,
- the first communication path being a communication path for communication between the vehicle and the server, and the second communication path being a communication path for communication between the transfer equipment and the server, and
- a control device configured to process data received using the communication device.

The control device is configured to

- perform a synchronization process of synchronizing first data including information on the energy storage device and second data including the information by using a difference between a first time and a second time, the first time being a time at which the first data is received through the first communication path when the transfer equipment and the vehicle are connected, and the second time being a time at which the second data is received through the second communication path when the transfer equipment and the vehicle are connected.

In this case, since the difference between the first time and the second time corresponds to the difference between communication delays, the first data and the second data can be synchronized using the difference. As a result, control using the first data and the second data can be accurately performed. It is therefore possible to appropriately handle information acquired through different communication paths.

In one embodiment, the control device may be configured to synchronize time information in the first data with time information in the second data by using the difference.

Since the time information in the first data is synchronized with the time information in the second data having a smaller communication delay than the first data, the control using the first data and the second data can be more accurately performed.

In another embodiment, the control device may be configured to perform power control between the vehicle and the power grid using the first data and the second data that have been synchronized.

This makes it possible to accurately perform the power control between the vehicle and the power grid using the first data and the second data.

The present disclosure can provide a power management system that appropriately handles information acquired through different communication paths.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
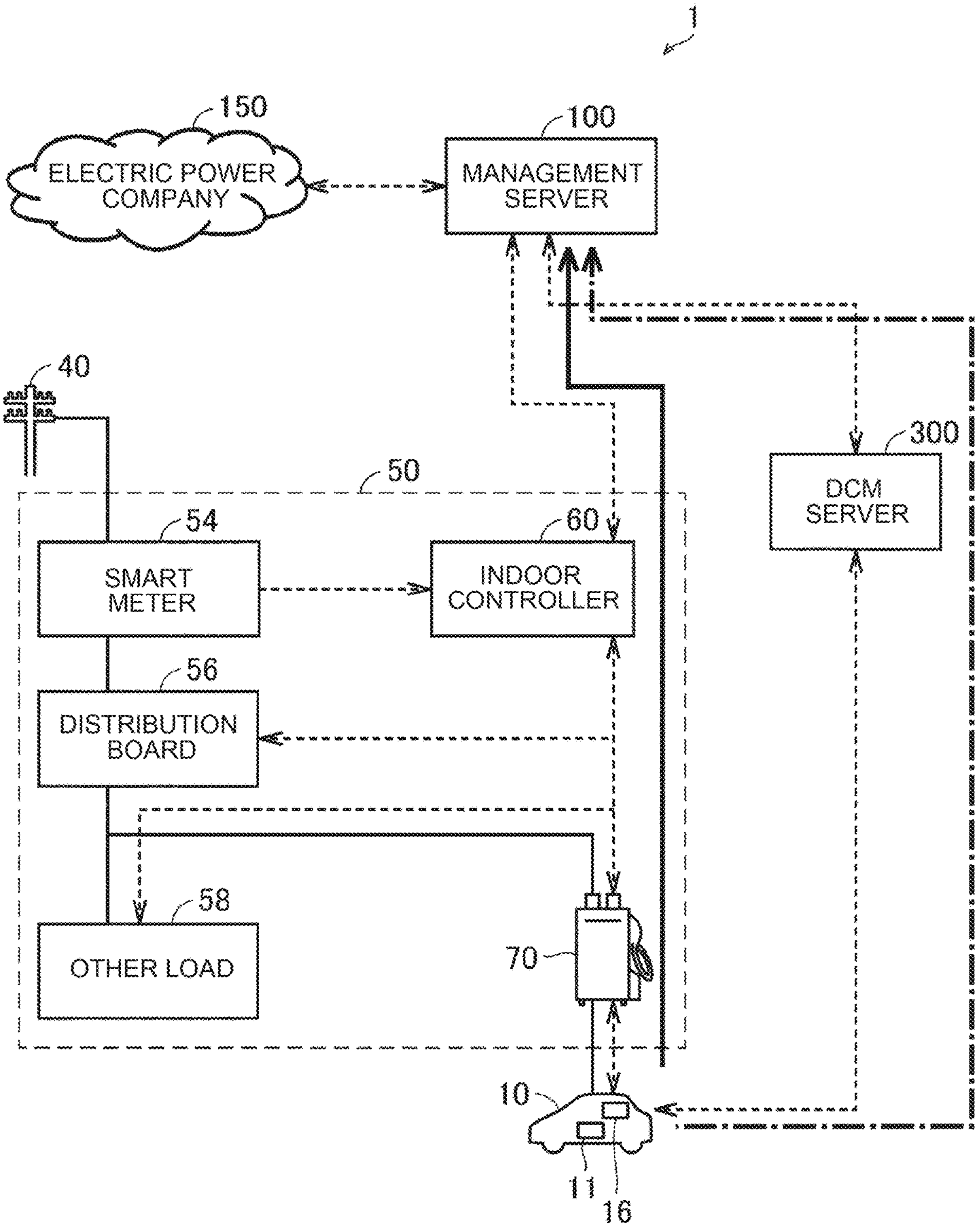
FIG. 1 is a diagram illustrating an example of a configuration of a power management system according to the present embodiment.

Hereinafter, an embodiment of the present disclosure will be described in detail with reference to the drawings. It should be noted that the same or corresponding parts in the drawings are designated by the same reference characters and repetitive description will be omitted.

FIG. 1 is a diagram illustrating an example of a configuration of a power management system 1 according to the present embodiment. As illustrated in FIG. 1, the power management system 1 includes a vehicle 10, an electric power system 40, a building 50, a management server 100, and a Data Communication Module (DCM) server 300.

The building 50 includes a smart meter 54, a distribution board 56, additional loads 58, an indoor controller 60, and an Electric Vehicle Supply Equipment (EVSE) 70.

The smart meter 54 detects the amount of electric power transferred between the electric power system 40 and the building 50 (more specifically, the distribution board 56). The smart meter 54 detects, for example, an amount of electric power supplied from the electric power system 40 to the building 50. Further, the smart meter 54 detects, for example, an amount of electric power supplied from the building 50 to the electric power system 40. The smart meter 54 transmits information indicating the detected amount of power to the indoor controller 60.

The distribution board 56 enables the electric power supplied from the electric power system 40 to be supplied to various electric devices including EVSE 70 and the loads 58. The distribution board 56 is provided with a cutoff circuit capable of shutting off power supply to various electric devices such as a breaker. The other loads 58 are provided in the building 50, for example, and include various electric devices (for example, household electric appliances) other than EVSE 70.

The indoor controller 60 is a control device for managing power supplied from the electric power system 40 to various electric devices in the building 50 via the distribution board 56, and power supplied from any one of the power sources in the building 50 to the electric power system 40 via the distribution board 56. The indoor controller 60 is configured to be able to acquire information from the smart meter 54 and various electrical devices connected as control targets, and to transmit various control commands to various electrical devices. The various electric devices include, for example, a EVSE 70 described later. The various control commands include, for example, an execution command of charge control.

EVSE 70 is transfer equipment configured to perform power transfer, which is configured to be connectable to the vehicle 10 using connectors and cables. EVSE 70 supplies the electric power supplied from the distribution board 56 to the vehicle 10 or supplies the electric power supplied from the vehicle 10 to the distribution board 56 in response to a control signal from the indoor controller 60. EVSE 70 may be configured to provide DC power to the energy storage device 11 mounted on the vehicle 10. Alternatively, EVSE 70 may be configured to supply AC power to a charging device mounted on the vehicle 10, convert the AC power into DC power in the charging device, and supply the DC power to the energy storage device 11.

The vehicle 10 is an electrified vehicle including an energy storage device 11 configured by a DC power source capable of being recharged, a drive device (not shown) configured by an electric motor or the like, and a communication device 16 including a DCM. The energy storage device 11 may be, for example, a secondary battery such as a lithium-ion battery in which a nickel metal hydride battery or an electrolyte is liquid or solid, or may be a capacitor or the like. The vehicle 10 is configured to be able to charge the energy storage device 11 using electric power supplied from EVSE 70. In addition, the vehicle 10 is configured to be able to supply power to EVSE 70 of the energy storage device 11. Further, the vehicle 10 is configured to communicate (e.g., wirelessly communicate) with DCM servers 300 using the communication device 16 (specifically, DCM). In addition, the vehicle 10 is configured to communicate (e.g., wired communication) with EVSE 70 through the connector and the cable using the communication device 16 when the connector of EVSE 70 is connected to an inlet (not shown) of the vehicle 10. Although the vehicle 10 is illustrated in FIG. 1 as a typical example, a plurality of vehicles other than the vehicle 10 may be connected to a EVSE other than EVSE 70.

The management server 100 performs supply-and-demand management of electric power in a power grid formed in a predetermined region including the building 50 in response to a supply-and-demand request for electric power from the electric power company 150. The management server 100 transmits a control command to supply power to the electric power system 40 to a control target capable of supplying power including the building 50 in the power grid, for example, in a case where an increase in supply of power is requested from the electric power company 150. In the control target in the power grid, the power supplied to the electric power system 40 increases according to the control command, so that the request of the electric power company 150 can be satisfied.

DCM servers 300 are configured to be able to communicate with a plurality of vehicles (including the vehicle 10) on which DCM is mounted. For example, DCM servers 300 receive information on energy storage devices mounted from a plurality of vehicles on which DCM is mounted, or transmit updated information such as various control programs to a plurality of vehicles on which DCM is mounted. The information about the energy storage device received by DCM servers 300 includes information about state of charge (SOC) of the energy storage device, information about the chargeable power amount, information about the dischargeable power amount, and the like.

The vehicle 10, the indoor controller 60, EVSE 70, the management server 100, and DCM server 300 are configured to exchange various types of data through communication.

Figure 2:
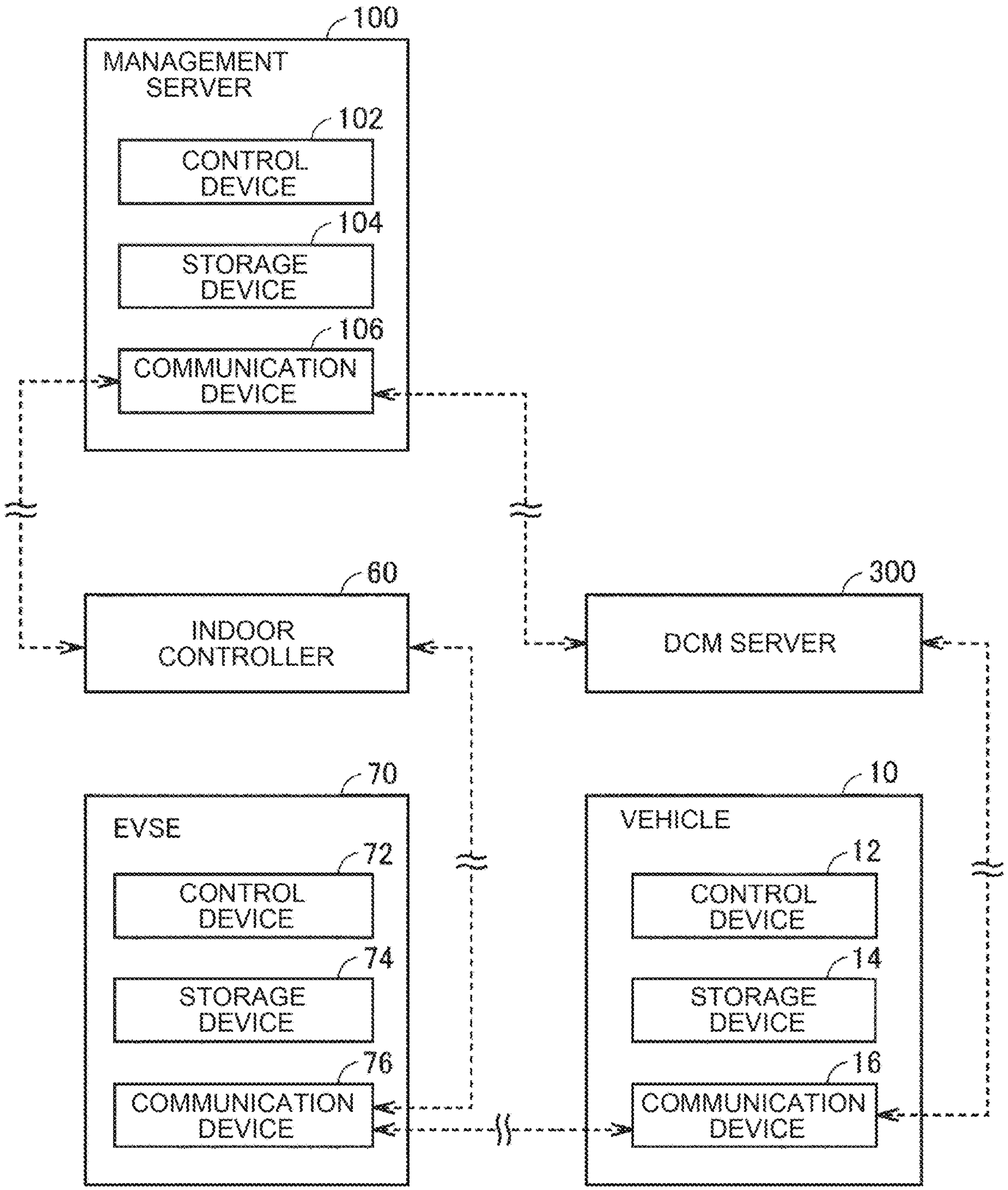
FIG. 2 is a diagram illustrating an example of a communication configuration of the power management system according to the present embodiment.

FIG. 2 is a diagram illustrating an example of a communication configuration of the power management system 1 according to the present embodiment. As illustrated in FIG. 2, the vehicle 10 includes an Electronic Control Unit (ECU) 12, a storage device 14, and a communication device 16. ECU 12 has a Central Control Unit (CPU) and memories (Read Only Memory (ROM) and Random Access Memory (RAM)) (not shown). A power supply process for supplying power of the energy storage device 11 to EVSE 70 or a charging process for charging the energy storage device 11 using power from EVSE 70 based on various kinds of information stored in the memories or various kinds of information acquired by communication is executed. The various types of data include a charge command and a discharge command from EVSE 70. The storage device 14 stores various types of information received using the communication device 16 and predetermined information. The communication device 16 includes a DCM capable of wirelessly communicating with DCM servers 300 through a communication network (e.g., a mobile telephone line or the like) (not shown) and a communication unit capable of wired communication with EVSE 70 (not shown). Wired communications include, for example, Power Line Communication (PLC) communications, Controller Area Network (CAN) communications, and the like.

The indoor controller 60 includes CPU and memories (not shown). The indoor controller 60 executes a process related to supply-and-demand management of electric power in the building 50 on the basis of various kinds of information stored in the memory, various kinds of information acquired by communication with EVSE 70 and the management server 100. The process related to the supply-and-demand control of the electric power in the building 50 includes, for example, a process of transmitting a charging process execution command (charging command) to EVSE 70 and a process of transmitting a discharging process execution command (discharging command). In response to a request from the management server 100, the indoor controller 60 transmits, to the management server 100, information about the energy storage device 11 mounted in the vehicle 10 to be controlled by the management server 100 in the power grid. Alternatively, when information about the energy storage device 11 is received from the vehicle 10, the indoor controller 60 may transmit the information to the management server 100 regardless of the presence or absence of a request from the management server 100.

EVSE 70 includes a control device 72, a storage device 74, and a communication device 76. The control device 72 includes a CPU and a memory (not shown), and transmits a charge command to the vehicle 10 based on various kinds of information stored in the memory and various kinds of information acquired by communication, or transmits a discharge command to the vehicle 10. The storage device 74 stores various kinds of information received by using the communication device 76 and predetermined information. The communication device 76 is configured to be capable of communicating with the indoor controller 60 or with the vehicle 10 via a communication network by wireless or wired communication.

The management server 100 includes a control device 102, a storage device 104, and a communication device 106. The control device 102 includes a CPU and a memory (not shown), and executes a process related to supply and demand control in the power grid based on various kinds of information stored in the memory and various kinds of information acquired by communication. The process related to the supply-and-demand management in the power grid includes, for example, a process of transmitting a charging command to the indoor controller 60 and a process of transmitting a discharging command. Further, the management server 100 acquires information for performing supply-and-demand management (for example, information regarding the energy storage device 11 mounted on the vehicle 10) from the indoor controller 60 and DCM servers 300.

The storage device 104 stores various types of information received using the communication device 106 and predetermined information. The storage device 104 stores, for example, information (for example, a vehicle number, a vehicle carriage number, or the like) for specifying a vehicle to be controlled in supply-demand management in the power grid. These pieces of information are used by the management server 100 to acquire information about the vehicle 10 from DCM server 300.

The communication device 106 is configured to be capable of communicating with DCM servers 300 or with the indoor controller 60 via a communication network (e.g., the Internet or a dedicated line) that is not illustrated in the drawings, wirelessly or by wire.

DCM servers 300 include CPU and memories (not shown). DCM server 300 executes a process of exchanging information related to the energy storage device with each of the plurality of vehicles based on various kinds of information stored in the memory and various kinds of information acquired by communication with the plurality of vehicles or the management server 100. In response to a request from the management server 100, DCM server 300 transmits, to the management server 100, information about the energy storage device 11 mounted on the vehicle 10 to be controlled by the management server 100 in the power grid. Alternatively, when the information about the energy storage device 11 is received from the vehicle 10, DCM server 300 may transmit the information to the management server 100 regardless of whether or not there is a request from the management server 100.

In the power management system 1 having the above-described communication configuration, communicable devices communicate with each other in accordance with various communication standards.

The management server 100 acquires information (e.g., state of charge (SOC) and other information) about the energy storage devices from a plurality of vehicles including the vehicle 10 in order to estimate the chargeable/dischargeable amounts of the plurality of vehicles in the power grid.

The information about the energy storage device is transmitted by at least one of a first communication path (a dashed-dotted line arrow in FIG. 1) leading to the management server 100 via DCM server 300 without passing through EVSE 70, and a second communication path (a solid line arrow in FIG. 1) leading to the management server 100 via EVSE 70 and the indoor controller 60.

For example, when ECU 12 of the vehicle 10 is not connected to EVSE 70, it transmits information about the energy storage device 11 to the management server 100 via the first communication path. On the other hand, when ECU 12 of the vehicle 10 is connected to EVSE 70, for example, the information about the energy storage device 11 is transmitted to the management server 100 through each of the first communication path and the second communication path.

When data including the same information is transmitted on both paths, depending on the reliability of each communication path, data may be received at different timings due to a delay or the like. When the communication device 16 and DCM server 300 include a route on which a radio communication such as a mobile telephone line is performed, if the radio wave condition is deteriorated when the vehicle 10 travels or stops in a tunnel or underground than in a normal state, the communication from the communication device 16 to DCM server 300 may be delayed or the like. In this case, it is required to appropriately handle the received data.

Therefore, in the present embodiment, the management server 100 operates as follows. That is, the management server 100 performs a synchronization process of synchronizing the first data including information on the energy storage device 11 and the second data including the information by using a difference between a first time and a second time, the first time is a time at which the first data is received through the first communication path when the EVSE 70 and the vehicle 10 are connected, and the second time is a time at which the second data is received through the second communication path when the EVSE 70 and the vehicle 10 are connected.

Since the difference between the first time and the second time corresponds to the difference between the communication delays, the first data and the second data can be synchronized by using the difference. As a result, the control using the first data and the second data can be performed with high accuracy. Therefore, it is possible to appropriately handle information acquired on different communication paths.

Figure 3:
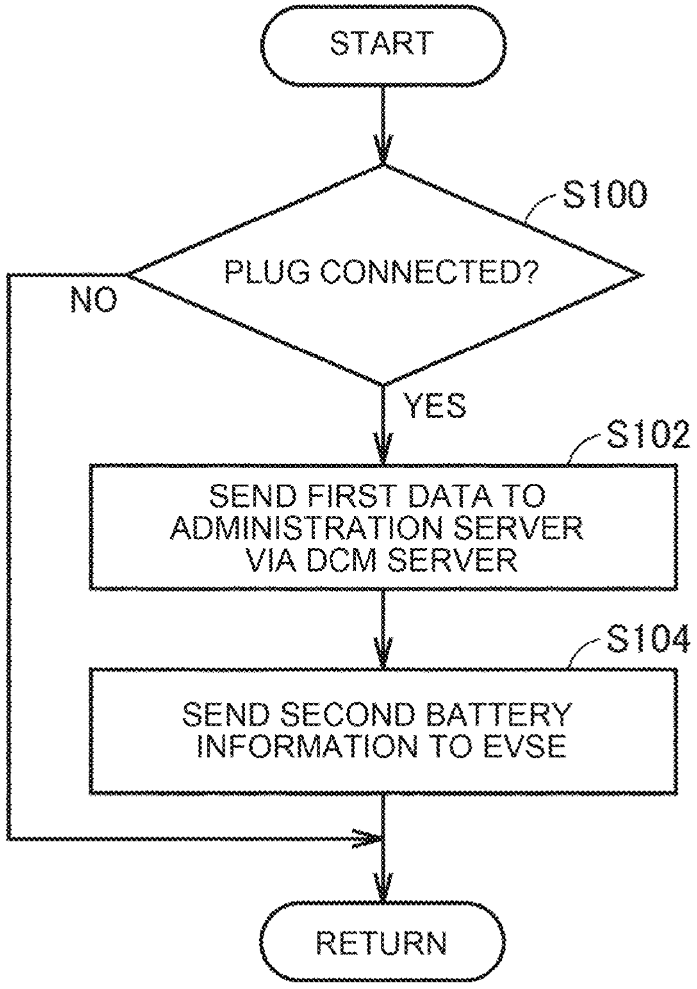
FIG. 3 is a flowchart illustrating an example of a process executed in a vehicle.

Hereinafter, a process executed in (ECU 12 of) the vehicle 10 will be described referring to FIG. 3. FIG. 3 is a flowchart illustrating an example of a process executed by the vehicle

Figure 4:
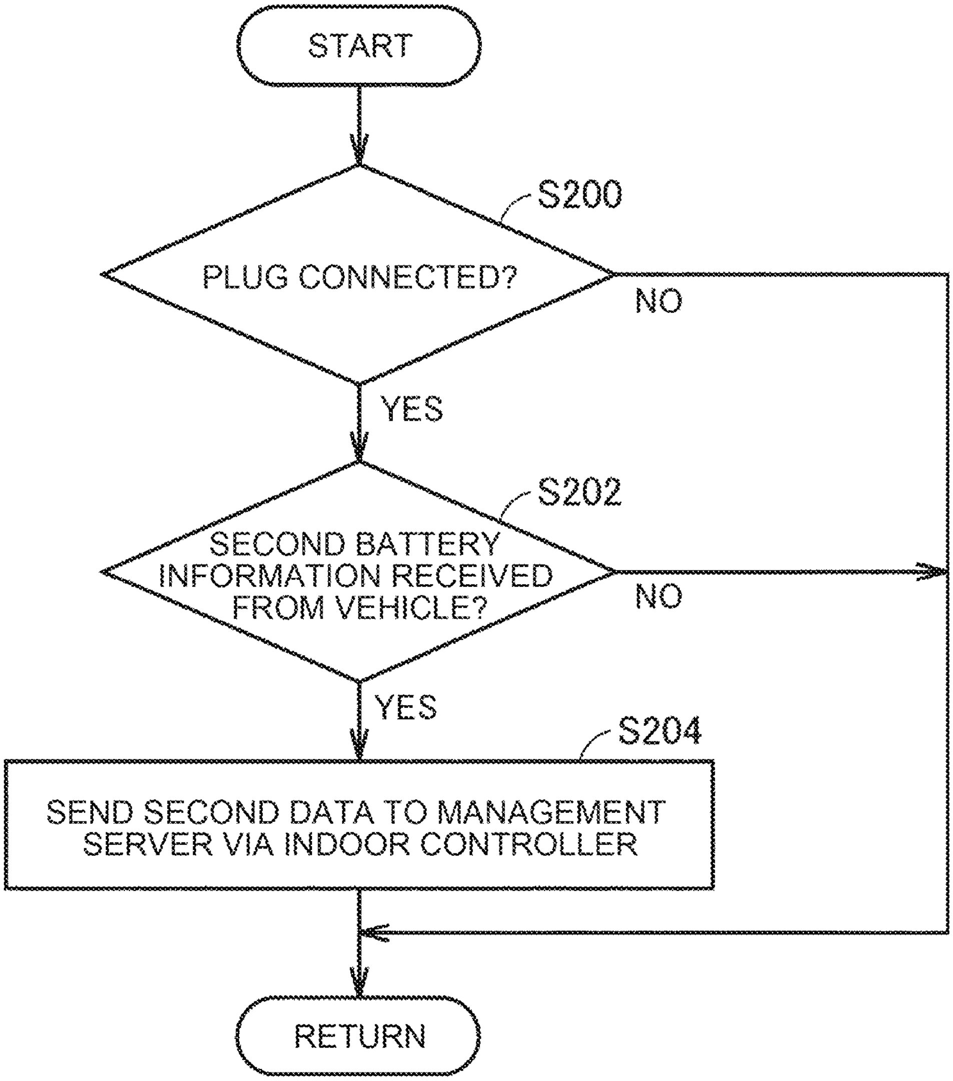
FIG. 4 is a flowchart illustrating an exemplary process performed by EVSE.
Figure 5:
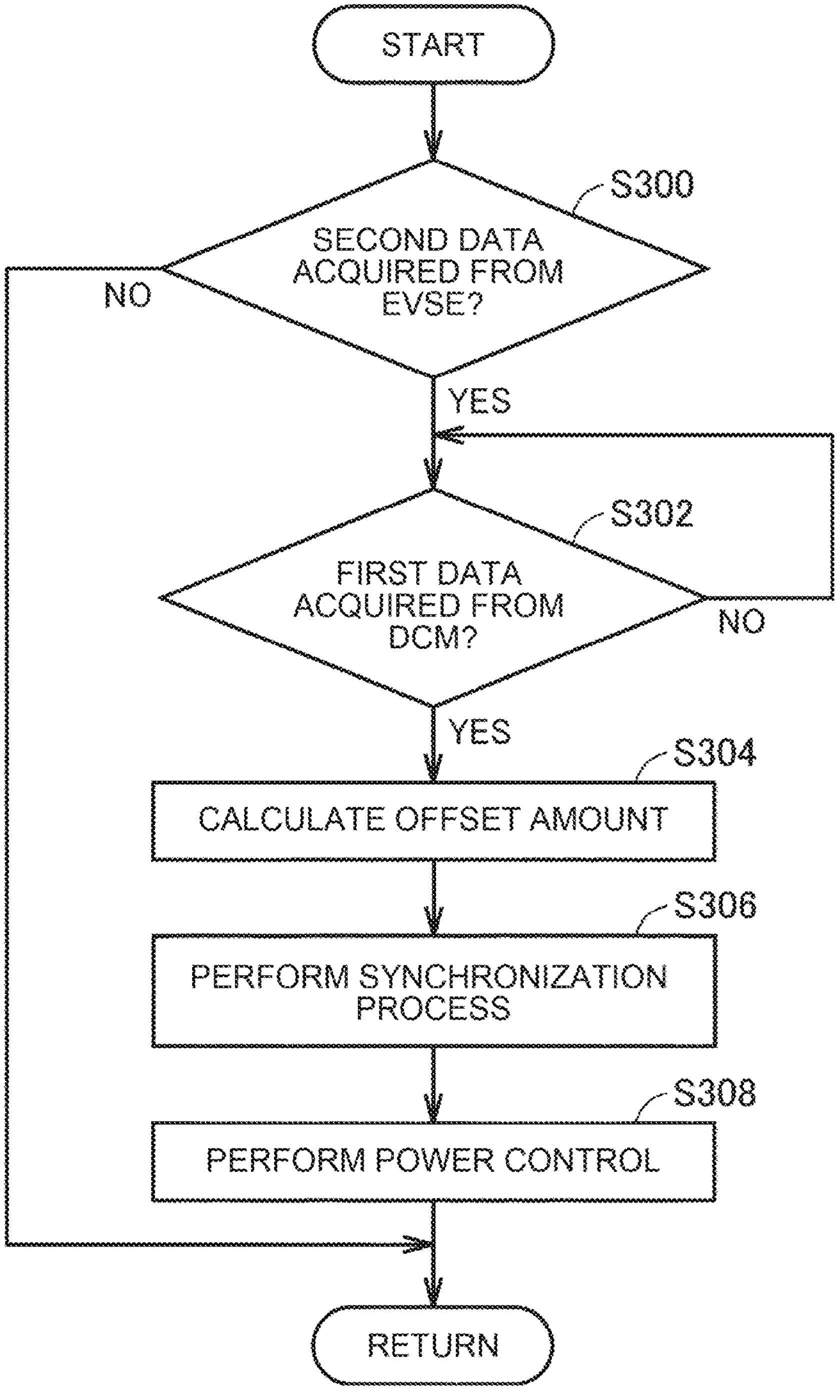
FIG. 5 is a flowchart illustrating an exemplary process executed by the control server.

10. The series of processes shown in the flowcharts of FIGS. 3 to 5 is repeatedly executed at predetermined intervals.

In step (hereinafter, step is referred to as S) 100, ECU 12 determines whether or not it is plugged. ECU 12 may, for example, determine that it is plugged in when EVSE 70 connector is connected to the inlet of the vehicle 10. ECU 12 may, for example, determine that the connector is connected when an on signal is received from circuitry (not shown) that outputs an on signal when the connector is connected to the inlet. If it is determined that it is plugged in (YES at S100), the process is moved to S102.

In S102, ECU 12 transmits first data including a transmission time (hereinafter, referred to as a first time) and information about SOC of the energy storage device 11 (hereinafter, referred to as first battery information) to the management server 100 through DCM server 300 using the communication device 16. ECU 12 sets, as the first time, a transmission time at which the first data is transmitted to DCM servers 300. ECU 12 sets the first time using the time information measured internally. The process is then transferred to a S104.

In S104, ECU 12 transmits information about SOC of the energy storage device 11 (hereinafter, referred to as second battery information) to EVSE 70 using the communication device 16. The process is then terminated. If it is determined that there is no plugging (NO in S100), this process is terminated.

Next, a process executed by EVSE 70 (control device 72 of the EVSE 70) will be described referring to FIG. 4. FIG. 4 is a flow chart illustrating an exemplary process executed by EVSE 70.

In S200, the control device 72 determines whether or not it is plugged. For example, the control device 72 may determine that the connector is plugged in a case where the connector is connected to the inlet of the vehicle 10. For example, the control device 72 may determine that the connector is connected when a signal indicating that the connector is connected from the vehicle 10 to the inlet is received by wired communication via the cable or by wireless communication. If it is determined that it is plugged in (YES at S200), the process is moved to S202.

In S202, the control device 72 determines whether or not to receive the second battery information from the vehicle 10. When it is determined that the second battery information has been received from the vehicle 10 (YES in S202), the process proceeds to S204.

In S204, the control device 72 transmits the second data including the transmission time (hereinafter, referred to as the second time) and the second battery information to the management server 100 through the indoor controller 60. The control device 72 sets the transmission time to be transmitted to the indoor controller 60 as the second time. The control device 72 sets the second time using time information measured internally. The process is then terminated. When it is determined that there is no plugging (NO in S200), or when it is determined that the second battery information is not received from the vehicle 10 (NO in S202), the process is terminated.

Next, a process executed by the control device 102 of the management server 100 will be described with reference to FIG. 5. FIG. 5 is a flowchart illustrating an example of a process executed by the management server 100.

In S300, the control device 102 determines whether or not the second data has been acquired from any EVSE in the power grid. Note that the control device 102 causes the storage device 104 to store the received second data in association with the received time, at least when the second data is received for the first time. If it is determined that the second data has been acquired from any EVSE in the power grid (YES at S300), the process proceeds to S302.

In S302, the control device 102 determines whether or not the first data has been acquired from DCM servers 300. The control device 102 identifies the vehicle 10 connected to EVSE 70 using the second data, for example, and requests the first data for the identified vehicle 10 from DCM servers 300. DCM server 300 may transmit the first information about the vehicle 10 to the management server 100 in response to the request. Alternatively, the control device 102 may extract and acquire the first data about the vehicle 10 from various data sequentially received from DCM servers 300. Note that the control device 102 causes the storage device 104 to store at least the time when the first data is received and the first data received in association with each other. When it is determined that the first data has been acquired from DCM servers 300 (YES in S302), the process proceeds to S304.

In S304, the control device 102 calculates the offset value. The control device 102 calculates, as an offset amount, a difference between the reception time of the first data received first after being plugged in the vehicle 10 (hereinafter, referred to as the first reception time) and the reception time of the second data received first after being plugged in the vehicle 10 (hereinafter, referred to as the second reception time). The offset value indicates a difference between a delay time from when the first data is transmitted from the vehicle 10 to when it is received by the management server 100 through DCM server 300 and a delay time from when the second data is transmitted from EVSE 70 to when it is received by the management server 100. In this case, the first data is transmitted from the vehicle 10 at a timing when it is determined that the first data is plugged. In addition, the first second data is transmitted from EVSE 70 at the same level of timing determined to be plugged. As a result, the difference between the first reception time and the second reception time indicates the difference in the delay time, and is calculated as the offset amount. The process is then transferred to S306.

In S306, the control device 102 executes a synchronization process. More specifically, the control device 102 sets the time at which the reception time of the first data in the management server 100 is traced back by the offset amount to the reception time after synchronization. The control device 102 executes processing of associating battery information of the first data corresponding to the reception time before synchronization with the reception time after synchronization as synchronization processing. The control device 102 performs synchronization processing on the first data received while being plugged in. The process is then transferred to S308.

In S308, the control device 102 performs power control using the synchronized first data and second data. The power control includes power control related to supply and demand management, and includes, for example, charge/discharge control of the energy storage device 11. When the first data is acquired from DCM servers 300 so as to include more detailed information than the second data, the control device 102 complements the second data by using the first data. The control device 102 accurately estimates a change in SOC and SOC of the energy storage device 11 using the first data and the second data. As a result, it is possible to perform supply-and-demand management of electric power in the electric power grid in accordance with a supply-and-demand request from the electric power company 150. The process is then terminated. On the other hand, when it is determined that the second data is not to be acquired from EVSE 70 (NO in S300), this process is terminated. When it is determined that the first data is not to be acquired from DCM servers 300 (NO in S302), the process returns to S302.

The operation of the power management system 1 according to the present embodiment based on the above-described configuration and flowchart will be described with reference to FIG. 6.

Figure 6:
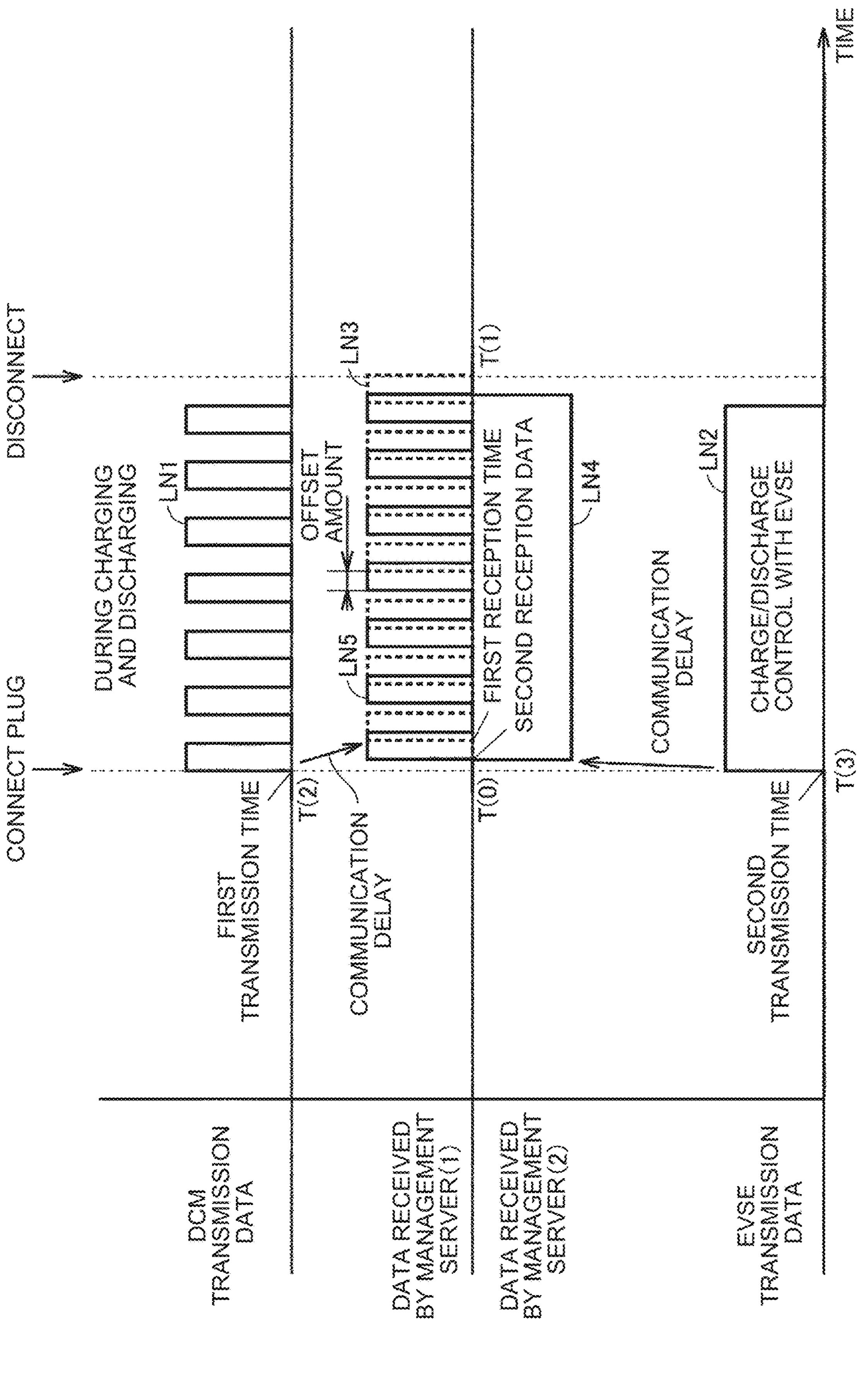
FIG. 6 is a diagram for explaining an operation of the power management system.

FIG. 6 is a diagram for explaining an operation of the power management system 1. The horizontal axis in FIG. 6 represents time. The vertical axis in FIG. 6 indicates the data amount of the transmission data from DCM, the data amount of the received data (1) from DCM received by the management server, the data amount of the received data (2) from EVSE 70 received by the management server, and the data amount of the transmission data from EVSE. In addition, LN1 of FIG. 6 shows a change in the data volume of the transmitted data from DCM. LN2 of FIG. 6 shows a change in the data volume of the transmitted data from EVSE 70. LN3 of FIG. 6 shows the change in the data quantity of the received data (1) prior to synchronization. LN4 of FIG. 6 shows a change in the data quantity of the received data (2). LN5 of FIG. 6 shows the change in the data quantity of the received data (2) after synchronization. Note that in FIG. 6, it is assumed that the times measured inside the vehicle 10, the management server 100, and EVSE 70 are not synchronized (the times measured even when they are connected to the same plug-in are not synchronized). Further, in FIG. 6, it is assumed that the connection is disconnected at the time T(1) by being plugged into the time T(0) based on the time measured by the management server 100.

For example, when a plug connection is performed in the vehicle 10 (YES in S100), as shown in LN1 of FIG. 6, the first data including the transmission time T(2) connected to the management server 100 via DCM server 300 and the first battery information is transmitted (S102). In addition, EVSE 70 is S104 with the second battery-information through the connector-cable.

In EVSE 70, when the plug connection is performed (YES in S200) and the second battery information is received from the vehicle 10 (YES in S202), as shown in LN2 of FIG. 6, the second data including the transmission time T(3) and the second battery information plugged into the management server 100 is transmitted through the indoor controller 60 (S204).

As shown in LN4 and LN5 of FIG. 6, the management server 100 receives the data after a predetermined delay period has elapsed. That is, when the second data is received at the second reception time (YES in S300), the management server 100 receives the first data transmitted first at the first reception time (YES in S302), and sets the difference between the first reception time and the second reception time as the offset value (S304).

Then, the synchronization process is executed (S306), and the time at which the reception time associated with the battery information of the first data is traced back by the offset amount is set as the reception time after the synchronization. Consequently, as shown in LN5 of FIG. 6, the reception time of the first data and the reception time of the second data are synchronized. Power control is performed using the synchronized first data and second data (S308). The management server 100 performs power control by treating the first data at the reception time after synchronization and the second data at the corresponding reception time as having data at the same time.

As described above, according to the power management system 1 of the present embodiment, since the difference between the first reception time and the second reception time corresponds to the difference of the communication delay, the first data and the second data can be synchronized by using the difference. As a result, the control using the first data and the second data can be performed with high accuracy. Therefore, it is possible to provide a power management system that appropriately handles information acquired on different communication paths.

In addition, the synchronization process can be executed even when at least one of the time measured in the vehicle 10, the time measured in the management server 100, and the time measured in EVSE 70 differs from each other. Therefore, the power control using the synchronized first data and the synchronized second data can be performed with high accuracy.

Further, by synchronizing the first data with the second data having a smaller delay time, power control using the first data and the second data can be performed with high accuracy. In the present embodiment, the case where the first data is synchronized with the second data having a smaller delay time has been described as an example, but the second data may be synchronized with the first data having a larger delay time, such as when the difference in delay time is small.

Modification examples will be described below.

In the above-described embodiment, the first data and the second data are synchronized with each other. When the delay time of the first data or the delay time of the second data can be specified, the first data and the second data may be synchronized with the time measured in the management server 100. In this way, power control using the first data and the second data can be performed with higher accuracy.

In the above-described embodiment, the battery data includes SOC of the energy storage device 11 as an example. For example, instead of or in addition to SOC, at least one of a capacity capable of being discharged, a capacity capable of being charged, a power amount capable of being discharged at present, and a power amount capable of being charged at present may be included.

All or some of the above-mentioned modified examples may be combined for implementation.

It should be considered that the embodiments disclosed above are for illustrative purposes only and are not limitative of the disclosure in any aspect. The scope of the disclosure is represented by the appended claims, not by the above description, and includes all modifications within the meanings and scope equivalent to the claims.

What is claimed is:

1. A power management system comprising:

a vehicle equipped with an energy storage device;

transfer equipment configured to perform power transfer between a power grid and the energy storage device; and a server configured to communicate with the vehicle, wherein:

the server includes a communication device configured to perform communication through a first communication path and a second communication path, the first communication path being a communication path for communication between the vehicle and the server, and the second communication path being a communication path for communication between the transfer equipment and the server, and a control device configured to process data received using the communication device; and the control device is configured to perform a synchronization process of synchronizing first data including information on the energy storage device and second data including the information by using a difference between a first time and a second time, the first time being a time at which the first data is received through the first communication path when the transfer equipment and the vehicle are connected, and the second time being a time at which the second data is received through the second communication path when the transfer equipment and the vehicle are connected.

2. The power management system according to claim 1, wherein the control device is configured to synchronize time information in the first data with time information in the second data by using the difference.

3. The power management system according to claim 1, wherein the control device is configured to perform power control between the vehicle and the power grid using the first data and the second data that have been synchronized.

* * * * *